Patented May 10, 1949

2,469,787

UNITED STATES PATENT OFFICE 2,469,787

PROCESS OF SOAKING HIDES WITH A SULFONATED PHENOL-FORMALDEHYDE CONDENSATION PRODUCT

Carl Riehs, Ludwigshafen-on-the-Rhine, Germany; vested in the Attorney General of the United States No Drawing. Application March 13, 1942, Serial No. 434,625. In Germany April 2, 1941

1 Claim. (Cl. 8—94.18)

This invention relates to a process of soaking all kinds of hides and skins in liquors, containing neutral-reacting phosphoric salts.

Hides, skins, and skins for fur are usually delivered to tanneries and fur dressers in dried or salted condition and, before being worked, must be brought in a condition similar to that of fresh hide, especially as far as the content of water is concerned. This is the purpose of the soaking process.

Soaking of dried hides and skins meets with certain difficulties, the dried collagen absorbing water but slowly. Long soaking periods, however, especially during the hot season, involve the risk of putrification caused by adhering dirt and leading to a loss of hide substance and a considerable reduction of the quality of the skins.

Since in many cases soaking with water alone does not satisfy, the addition of acids or alkalis has been proposed, which swell the hide and thus facilitate the absorption of water. Alkaline soaking has proved particularly effective, since by its fat-saponifying action it promotes wetting.

However, not only a suitable water content of the hide, but also its swelling condition is of great importance for the quality of the finished product. A suitably soaked hide should be in that special fallen condition by which it is characterized immediately after skinning. Acid or alkaline soaking, however, do not lead to the desired result and, moreover, their application includes certain risks consisting in the fact that acids and alkalis attack the hide, the result whereof may be a loss of hide substance. For these reasons less aggressive chemicals have been searched for, which at a neutral reaction would allow to obtain the desired soaking effect. Thus, the application of wetting agents with neutral reaction, salts of aromatic sulphonic acids, ammonium rhodanate etc. for soaking purposes was arrived at. Finally, slightly alkaline solutions of enzyme have been introduced for soaking fur skins. The desired accelerating action of these compositions is, however, very limited.

Now, I have found that absorption of water can also be accelerated without swelling the hides, by soaking them in neutral or almost neutral-reacting liquors, the pH-range of which is between pH 5 and pH 8, preferably, however, between pH 6 and pH 7, these liquors being obtained by dissolving salts of polymeric acids, the solution of which in water is neutral or slightly acid. Such polymeric acids are for instance the iso- and heteropolymeric acids, such as hexa- or paratungstic acid, hexavandium acid, as well as the neutral or slightly acid solutions of polymeric acids with phosphates, for example compounds from phosphoric acids and hexatungstic acid in the molecular proportion of 1:05.5 up to 1:2; further the polymeric acid selected from the group of condensed, aromatic sulphonic acids as obtained by sulphonating aromatic hydrocarbons or their oxy-compounds in usual way and subsequently condensing them with aldehydes. Finally, the substances produced by condensation in alkaline medium belong also to this class of polymeric acids.

Example 1.—For soaking dried hides and skins, a solution of 1 g. of paratungstate $Na_5HW_6O_{21}$ per litre of soaking liquor is used.

Example 2.—A solution of sodium molybdate, having been adjusted to a pH-value of about 7 by means of hydrochloric acid, is added to the soaking water in an amount of 1 to 2 g. of molybdate per litre of soaking liquor.

Example 3.—A solution of 1 to 2 g. per litre of soaking liquor of a phosphoric tungstate of the formula $2Na_2O.1P_2O_5.12WO_3$, having been adjusted to pH 6,5 by addition of acid, is used for soaking.

Example 4.—1000 g. of phenol or cresol and 1000 g. of concentrated sulphuric acid are heated to 100–120° C. and after cooling stirred with 500 g. of 40% formaldehyde. The condensation product is completely neutralized by addition of sodium hydroxide.

Example 5.—2 gram molecules of phenol and 1 gram molecule of formaldehyde are condensed at the reflux-cooler under addition of concentrated hydrochloric acid. The product is heated in vacuum as long as free phenol is present, then sulphonated at 100° C. with 1 gram molecule of concentrated sulphuric acid upon 1 gram molecule of phenol, and subsequently completely neutralized with sodium hydroxide.

What I claim is:

The process of soaking hides and skins in the nearly neutralized final product resulting from condensing under the addition of concentrated hydrochloric acid while refluxing in the ratio of two gram molecules of phenol to one gram molecule of formaldehyde, then condensing the product vacuum heated as long as free phenol is present, then sulphonating at 100° C. with concentrated sulphuric acid upon phenol in the ratio of one gram molecule of the former to one gram molecule of the latter.

CARL RIEHS.

REFERENCES CITED

The following references are of record in the file of this patent:

UNITED STATES PATENTS

| Number | Name | Date |
|---|---|---|
| 1,237,405 | Stiasny | Aug. 21, 1917 |
| 1,794,920 | Pospiech | Mar. 3, 1931 |
| 2,076,166 | Segessemann | Apr. 6, 1937 |
| 2,121,823 | Piggott | June 28, 1938 |
| 2,131,249 | Balle | Sept. 27, 1938 |

FOREIGN PATENTS

| Number | Country | Date |
|---|---|---|
| 280,233 | Germany | Nov. 9, 1914 |